(12) United States Patent
Davis, Jr. et al.

(10) Patent No.: US 6,250,063 B1
(45) Date of Patent: Jun. 26, 2001

(54) FUEL STAGING APPARATUS AND METHODS FOR GAS TURBINE NOZZLES

(75) Inventors: Lewis Berkley Davis, Jr.; David Justin Balevic, both of Niskayuna; Ronald Joseph Beaudoin, Schenectady; Warren James Mick, Altamont, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/377,248

(22) Filed: Aug. 19, 1999

(51) Int. Cl.$^7$ ........................................................ F02C 9/08
(52) U.S. Cl. ........................................ 60/39.03; 60/39.281
(58) Field of Search .......................... 60/39.03, 39.281, 60/739, 736

(56) References Cited

U.S. PATENT DOCUMENTS

| | | |
|---|---|---|
| 4,027,474 * | 6/1977 | Demase ............................ 60/39.28 R |
| 4,337,616 | 7/1982 | Downing . |

* cited by examiner

Primary Examiner—Timothy S. Thorpe
Assistant Examiner—Ehud Gartenberg
(74) Attorney, Agent, or Firm—Nixon & Vanderhye

(57) ABSTRACT

Each combustor for a gas turbine includes a fuel supply line for supplying fuel to a plurality of nozzles in the combustor. A remotely controlled valve has a valve member movable between valve-open and valve-closed positions. In a valve-closed position, fuel is supplied to a first group of one or more nozzles of the combustor, while fuel is cut off to a second group of one or more nozzles of the combustor. In a valve-open position, fuel is supplied to all nozzles of the combustor. By positively and selectively actuating the valve, the fuel/air ratio of the nozzles supplied by the fuel is increased to enhance flame stability.

1 Claim, 3 Drawing Sheets

FUEL STAGING APPARATUS AND METHODS FOR GAS TURBINE NOZZLES

BACKGROUND OF THE INVENTION

The present invention relates to apparatus and methods for staging the flow of fuel to the nozzles of a gas turbine combustor.

BRIEF SUMMARY OF THE INVENTION

Gas turbines generally have a plurality of combustors arranged in an annular array about the axis of the turbine for generating hot gases of combustion for flow through the turbine. Each combustor typically has a plurality of nozzles, for example, five or six nozzles, for flowing the gaseous fuel into the combustor. As well known, the combustors of a gas turbine must operate over a wide range of fuel/air ratios. The fuel/air ratio, for example, is low during turbine start-up and low-load operation and is high during high-load operation. Low fuel/air ratios, however, affect combustor flame stability. One approach to enhancing flame stability is to bias the fuel flow to some of the fuel nozzles in a combustor and cut off fuel flow entirely to one or more of the other nozzles. The combustion flame near the nozzles with increased fuel flow are thus at higher fuel/air ratios and, consequently, more stable.

The individual nozzles of each combustor are typically connected to a common fuel supply manifold. The main fuel control valve for the turbine regulates the flow of fuel to the manifold. Staging fuel to different groups of nozzles traditionally requires separate fuel supply manifolds and control valves for each group. While these have afforded flexibility in fueling each nozzle group, they have disadvantages. First, it adds significant cost and complexity to the turbine. Secondly, the response time to fill a large empty manifold hampers smooth turbine operation. Thirdly, purging fuel from previously fueled manifolds requires additional valves and piping. Finally, continuous purging of the unfueled manifolds may require an additional system to prevent condensation buildup.

In certain cases, on/off fuel control to some of the nozzles in each combustor is adequate to extend combustor operating capability. For example, passive pressure actuated valves located on or near the combustor may be opened or closed when a certain fuel pressure is reached. Passive valving, however, does not provide sufficient flexibility throughout the range of combustor operation and does not afford valve actuation with sufficient precision. That is, passive valving permits non-uniform movement of valve members, i.e., poppet valves, and permits varying fuel pressure from one nozzle to the next. Additionally, the passive valve springs are different and have non-uniform spring forces. For these and other reasons, spring actuated passive valves do not actuate simultaneously nor do such valves permit valve operation at more than one machine operation condition. By requiring the passive valves to actuate at a certain machine condition, the valves do not have the ability to operate at other machine conditions. Consequently, there is a need for a fuel control system for actively and selectively supplying fuel to one or more nozzles in each combustor and cutting off fuel supplied to one or more other nozzles of the same combustor and to do so at selected operating parameters.

In a preferred embodiment according to the present invention, there is provided a method of operating a fuel system for the nozzles of a gas turbine combustor, comprising the steps of (a) providing fuel under pressure for distribution to a plurality of fuel nozzles of the combustor and (b) positively and remotely controlling the distribution of the fuel to selectively supply fuel to a first group of one or more nozzles of the combustor and cutting off fuel flow to a second group of one or more nozzles of the combustor not including nozzles of the first group.

In a further preferred embodiment according to the present invention, there is provided a fuel system for a gas turbine, comprising a plurality of combustors each having a plurality of fuel nozzles, a fuel supply conduit for the nozzles of at least one of the combustors, a fuel distribution valve in the supply conduit and having a plurality of outlet ports for communicating fuel from the valve to the nozzles of the one combustor, the valve including a valve member movable between a first position for supplying fuel to the plurality of nozzles of the one combustor and a second position for supplying fuel to a first group of one or more nozzles of the plurality thereof, and cutting off fuel to a second group of one or more nozzles of the plurality thereof and a remote control for moving the valve member between the open and closed positions.

DETAILED DESCRIPTION OF THE INVENTION

Figure 1:
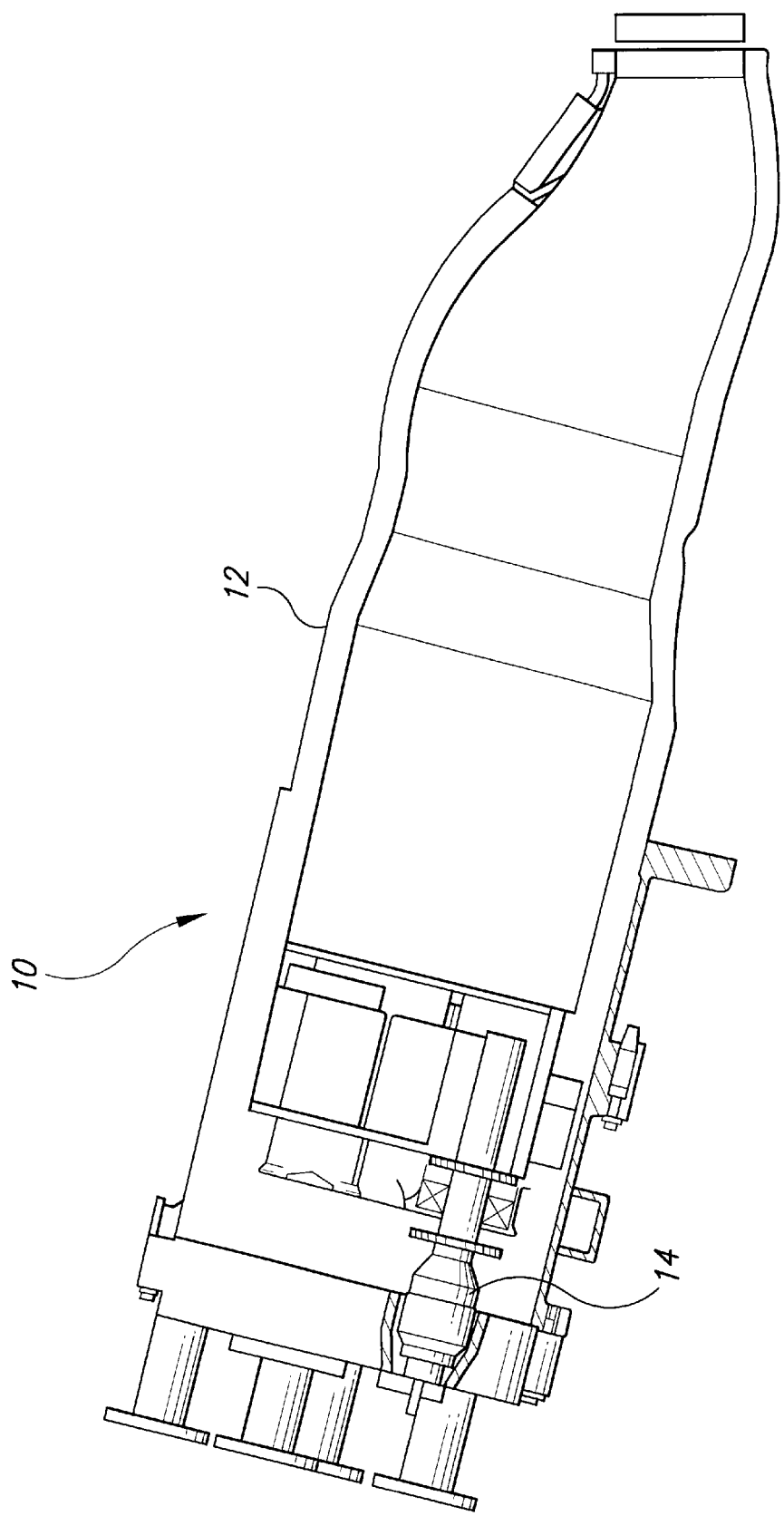
FIG. 1 is a side elevational view of a combustor for a turbine with parts broken out and in cross-section.

Referring now to the drawings, particularly to FIG. 1, there is illustrated a combustor 10 having a double-walled transition duct 12 connecting the outlet end of the combustor with the inlet end of the turbine to deliver hot products of combustion to the turbine. It will be appreciated that a gas turbine includes a plurality of combustors 10 generally arranged in an annular array about the axis of the turbine. It will also be appreciated that the combustor has a plurality of nozzles 14 for flowing fuel into the burning zone 16 of the combustor. The combustor and nozzle arrangement illustrated in FIG. 1 are conventional in design except for the fuel control system for supplying fuel to the nozzles in accordance with a preferred embodiment of the present invention.

Figure 2:
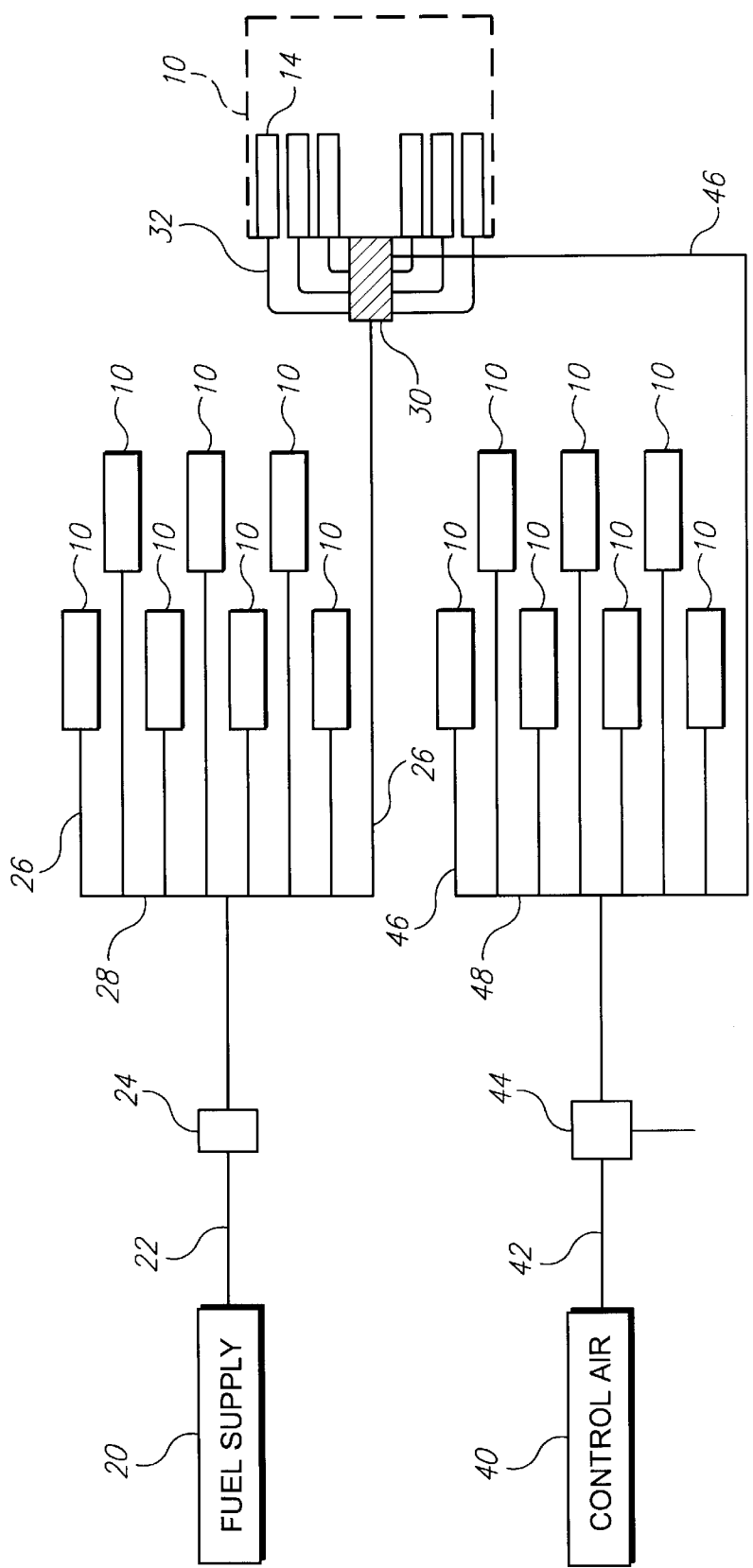
FIG. 2 is a schematic representation of a fuel control system for the nozzles of the combustor of FIG. 1 in accordance with a preferred embodiment of the present invention.

Referring now to FIG. 2, there is illustrated a fuel control system comprised of a gaseous or liquid fuel supply 20 for supplying fuel by way of a main supply conduit 22 and a control valve 24 to combustor supply lines 26 connected in parallel to a manifold 28. It will be appreciated that each of the supply lines 26 is connected to a combustor 10. The number of combustors and supply lines 26 can vary and the illustrated supply lines of combustor 10 are representative only. In the combustor 10 schematically illustrated in FIG. 2, there are six nozzles 14 which are supplied with fuel by a combustor supply line 26. Supply line 26 supplies fuel to a controlled fuel distributor valve 30 which, in turn, supplies fuel to the individual nozzles 14 via secondary or nozzle fuel supply lines 32.

A pneumatic system is employed to supply control air under pressure to the valve 30. Particularly, a control air supply 40 supplies air under pressure via an air supply line 42 and a staging control valve 44. The air supply line 42 supplies air under pressure to combustor air supply lines 46, coupled in parallel with an air supply manifold 48. With the foregoing arrangement, it will be appreciated that each of the controlled fuel distributor valves 30 for each combustor is provided with fuel via combustor fuel supply line 26 and air under pressure via combustor air supply line 46.

Figure 3:
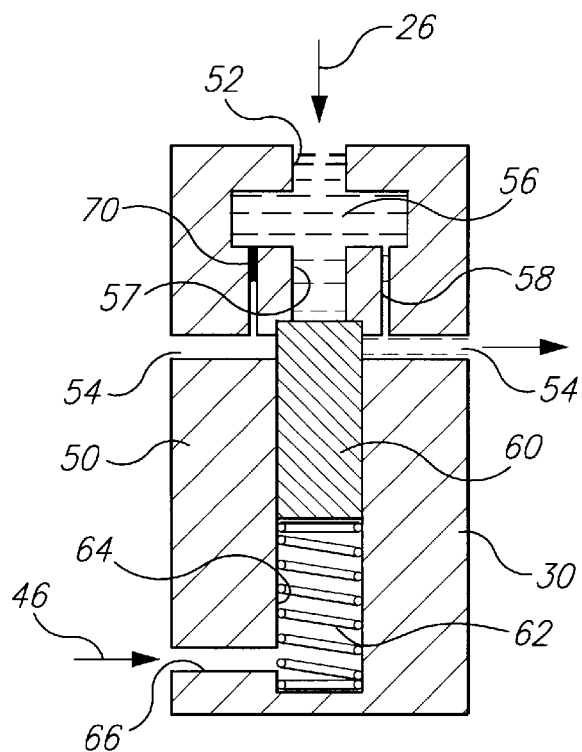
FIG. 3 is a cross-sectional view of a controlled fuel distributor valve in a position supplying fuel to a group of one or more nozzles and cutting off fuel to another group of one or more nozzles in the combustor.
Figure 4:
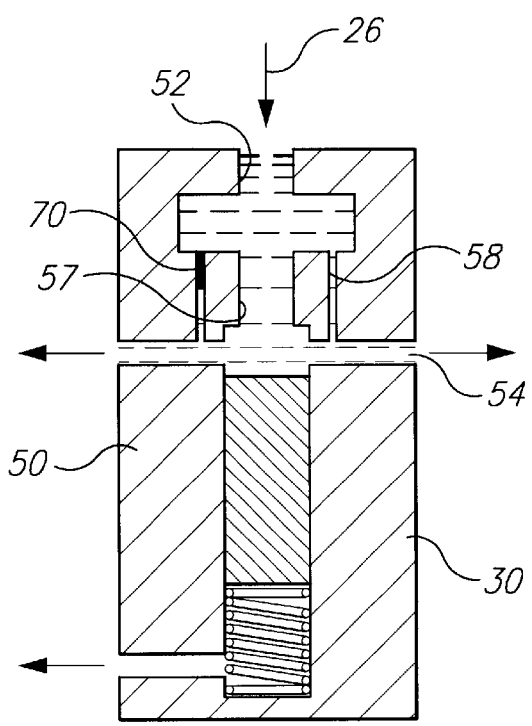
FIG. 4 is a view similar to FIG. 3 illustrating the valve in a fully open position supplying fuel to all nozzles of the combustor.

Referring to FIGS. 3 and 4, the valve 30 includes a valve body 50 having a fuel inlet 52 coupled to combustor fuel supply line 26 and a plurality of fuel outlet ports 54 respectively coupled to each of the nozzles 14 of the corresponding combustor 10, for example, as seen in the valve-open position illustrated in FIG. 4. The fuel inlet 26 supplies fuel to a chamber 56 having a central passage 57. A plurality of passages 58 communicate between the chamber 56 and the discrete outlet ports 54 for supplying fuel to discrete nozzles 14. The chamber 56 is bounded in part by the end of a movable member or poppet 60 which is biased by a spring 62 into the valve-closed position illustrated in FIG. 3 closing off central passage 57. The valve member 60 is movable within a cavity 64 toward and away from the fuel chamber 56.

Valve 30 also includes an air inlet port 66 in communication with the combustor air supply line 46. The air inlet port 66 supplies air to the cavity 64 on a side of the member 60 opposite the fuel chamber 56. Thus, the air under pressure supplied to cavity 64, together with spring 62, bias the movable valve member 60 toward the closed position. Consequently, to move the valve member 60 from the valve-closed position to the valve-open position illustrated in FIGS. 3 and 4, respectively, the fuel pressure in chamber 56 overcomes the bias of the spring 62 and the force on member 60 resulting from the supply of air under pressure into cavity 64 via air inlet 66. If the fuel pressure exceeds the combined bias of the spring and the air pressure, the valve member 60 moves from the closed position of FIG. 3 to the open position of FIG. 4 enabling flow of fuel through central passage 57 to ports 54. By varying the pressure of the air provided cavity 64, the valve member 60 can be displaced from the closed position to the open position dependent on the pressure of the air supplied cavity 64. Hence, valve 30 can be opened and closed at various turbine operating conditions.

In accordance with a preferred embodiment of the present invention, it is desirable to cut off the flow of fuel to one or more of a group of fuel nozzles 14 of the associated combustor while maintaining the flow of fuel to a group of one or more nozzles of the same combustor. Thus, one or more of the passages 58 communicating fuel between chamber 56 and the fuel outlet passage 54 for each nozzle can be closed. In the illustration of FIG. 3, a passage 58 is plugged at 70. In the valve-closed position therefore fuel is supplied from the fuel chamber 56 via passages 58 and 54 to one or more of a first group of nozzles associated with the combustor via the passages 58 which are open. Also, in that valve-closed position, fuel is cut off from a second group of one or more nozzles of the same combustor via the passage (s) 58 which are plugged. It will also be appreciated that the same predetermined magnitude of fuel is supplied to the valve 30 for distribution to the selected fuel nozzles similarly as the same magnitude of fuel is supplied to all of the fuel nozzles in the open position of the valve illustrated in FIG. 4. Consequently, by closing one or more passages 58, for example, by plugging the passage(s) at 70 and closing the valve 30, a higher fuel/air ratio is provided the nozzles to which fuel is being supplied while the fuel is cut off to one or more of the remaining nozzles. The higher fuel/air ratio, of course, improves the stability of the flame.

To employ the fuel control system of the present invention, for example, during start-up or low-load operation where flame instability may be a problem, air under pressure is supplied cavity 64 which, together with the spring 62, displaces the valve member 60 into a valve-closed position. In the valve-closed position, fuel from fuel chamber 56 is provided via open passages 58 and outlet ports 54 to the selected group of nozzles. Fuel is completely cut off from the other group of nozzles by the plugged passages 58. Accordingly, the fuel/air ratio of the selected nozzles during low-load operation or start-up is increased, affording increased stability to the flame. During higher load operations or full load, the air under pressure is controlled to supply air at a reduced pressure or the air flow to cavity 64 is stopped altogether. Thus, the fuel under pressure in fuel chamber 56 causes displacement of the valve member 60 away from the fuel chamber 56 enabling flow of fuel to all of the nozzles of the combustor via passages 54 through the central passage 57. Also, by varying the air flow pressure to chamber 64, the opening and closing of the valve 30 may be accomplished at different operating points of turbine operation as desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of altering the fuel/air ratio in a fuel supply system for a land-based electrical power-generating gas turbine combustor, comprising the steps of:

(a) providing a plurality of combustors about an axis of the gas turbine with each combustor having a plurality of fuel nozzles;

(b) providing fuel under pressure for distribution to a plurality of fuel nozzles of each combustor;

(c) altering the fuel/air ratio of a first group of one or more nozzles by positively and remotely controlling the distribution of the fuel to selectively supply fuel to (i) said first group of one or more nozzles of each combustor cutting off fuel flow to a second group of one or more nozzles of each combustor, not including nozzles of said first group and (ii) all of said nozzles;

(d) providing fuel under pressure in a fuel supply conduit and a valve member movable between positions opening the valve for distribution of the fuel supplied in the fuel supply conduit to all of said nozzles and closing the valve for distribution of fuel to said first group of nozzles;

(e) enabling displacement of said valve member responsive to a pneumatic pressure signal and displacing the valve member in response to a difference between fuel and pneumatic pressures; and (f) operating the turbine over a range of fuel/air ratios and controlling the distribution of the fuel to distribute fuel to said first group of nozzles and said first and second groups of nozzles, respectively, to provide turbine operation with different fuel/air ratios within said range thereof of said first group of nozzles and said first and second groups of nozzles, respectively.

* * * * *

UNITED STATES PATENT AND TRADEMARK OFFICE
CERTIFICATE OF CORRECTION

| | | |
|---|---|---|
| PATENT NO. | : 6,250,063 B1 | Page 1 of 1 |
| APPLICATION NO. | : 09/377248 | |
| DATED | : June 26, 2001 | |
| INVENTOR(S) | : Davis et al. | |

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*